Sept. 5, 1967  J. F. DUECKER  3,339,832
PIPE CONNECTIONS FOR AIRCRAFT GAS TURBINE ENGINES
Filed Aug. 19, 1965
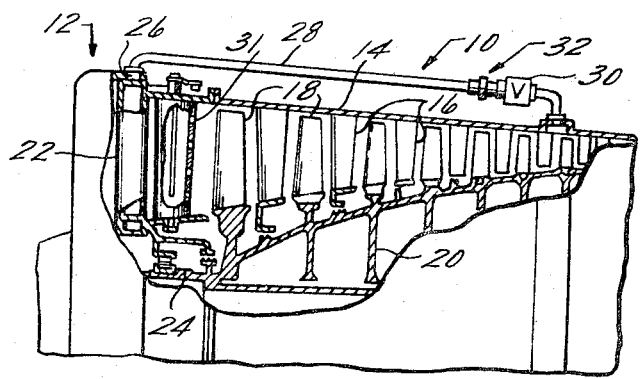
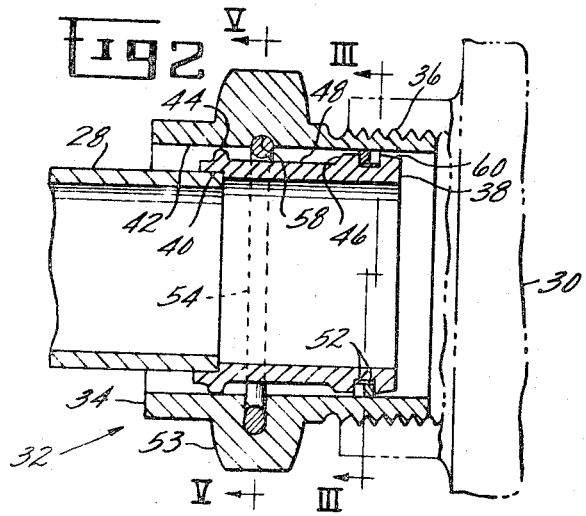
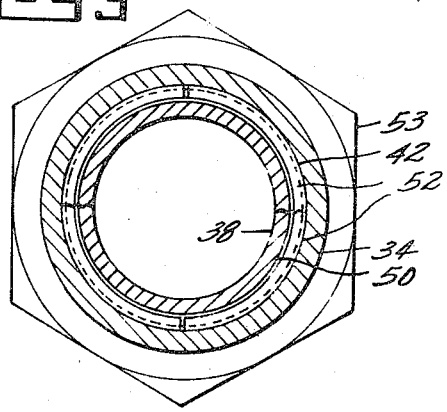
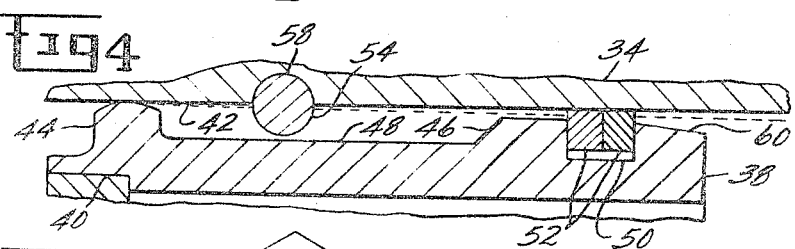
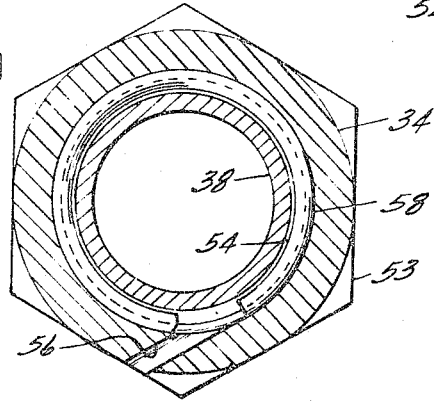
INVENTOR.
JOHN F. DUECKER
BY
ATTORNEY

# United States Patent Office 3,339,832
Patented Sept. 5, 1967

3,339,832
PIPE CONNECTIONS FOR AIRCRAFT GAS
TURBINE ENGINES
John F. Duecker, Cincinnati, Ohio, assignor to General
Electric Company, a corporation of New York
Filed Aug. 19, 1965, Ser. No. 481,130
3 Claims. (Cl. 230—132)

ABSTRACT OF THE DISCLOSURE

A coupling comprises two telescoped members which have radial clearance to permit axial misalignment while sealing rings are effective during relative axial movement between the telescoped members. Means limiting misalignment are relieved to facilitate axial movement at the limit of misalignment. A bent wire extending into a groove between the misalignment limiting means limits axial movement of the two members.

---

The present invention relates to improvements in pipe connections having particular utility in gas turbine engines.

The motivating environment for the present invention is in the axial flow compressors of gas turbine engines employed for the propulsion of aircraft. The front frame members of such compressors comprise struts which support a journal for the compressor rotor shaft. The air entering the compressor must necessarily pass by these struts in entering the compressor. A serious problem exists in that ice tends to form on these struts under certain weather conditions. The same icing problem exists with respect to the inlet guide valve for the compressor.

This icing problem has led to the use of a hollow front frame construction exemplified in U.S. Patent 3,123,283 which is connected to a source of hot air, conveniently derived from the compressor itself, to prevent icing of these components and ultimate engine failure. The conduit for the heated anti-icing air is best disposed externally of the compressor casing requiring connections to be made therewith at the front and rear portions of the compressor. Conventional connections, however, are not applicable for such purpose because of the differential expansion of the conduit and the compressor as a result of temperature variations and temperature differences therebetween. In the past, it has been accepted practice to interpose a bellows in the anti-icing air conduit to accommodate such differential expansion. While such expedient is functionally satisfactory, it is both costly and relatively heavy. The latter factor is particularly undesirable in aircraft engines where minimizing weight is of extreme importance.

Accordingly one object of the present invention is to provide an economical, lightweight connection for pipes carrying heated anti-icing air to the front frame of a gas turbine engine.

Another and broader object is to provide an improved means for connecting two conduits to permit relative axial movement therebetween with an utmost minimum of loss of the fluid being contained by the conduits.

In accordance with these objects a connection is provided which comprises first and second members telescoped together and relatively movable in an axial direction. The outer member is provided with a smooth inner bore while the inner member is provided with means effectively engaging and sealing said bore and also maintaining the two members in proper alignment for proper sealing action.

Preferably the connection is also provided with means disposed between the sealing and aligning means for limiting the relative axial movement of the two members so that sealing action is not lost at extreme temperature conditions or as a result of internal pressures within the conduits.

The above and other related objects and features of the invention will be apparent from a reading of the following description of the disclosure found in the accompanying drawing and the novelty thereof pointed out in the appended claims.

In the drawing:

FIGURE 1 is a fragmentary elevation of an axial flow compressor, as used in gas turbine engines, illustrating the overall combination in which the pipe connection of the present invention is embodied;

FIGURE 2 is a longitudinal section of this pipe connection;

FIGURE 3 is a section taken on line III—III in FIGURE 2;

FIGURE 4 is a fragmentary longitudinal section of the connection on a further enlarged scale; and FIGURE 5 is a section taken on line V—V in FIGURE 2.

Referring to FIGURE 1, an axial flow compressor 10, of the type referred to comprises a front frame 12 and an outer casing 14. Stator blades 16 are mounted on the casing 14 and alternate with rotor blades 18 mounted on a rotor 20. The front frame 12 has inwardly projecting, hollow struts 22 which support a journal for the shaft 24 of the rotorn 20. An annular chamber 26 surrounds the struts 22 and is connected by conduit means including a pipe 28 to one of the after stages of the compressor to derive heated anti-icing air therefrom. A valve 30 is provided in the conduit means to selectively control the flow of anti-icing air. Means may also be provided to connect the usual inlet guide vanes 31 to the chamber 26 so that anti-icing air will be supplied thereto as well as to the struts 22.

The elements thus far referred to, are more fully shown and described in the above-mentioned patent and reference may be had thereto if further details are desired.

It will be noted that the anti-icing air conduit (by way of pipe 28) is frequently subject to different temperatures than the elements of the compressor to which it is attached. This, plus differences in configuration and material, will cause a differential lengthwise expansion and contraction of the conduit and compressor during engine operation. To accommodate this condition, a slip connection 32 is provided in the conduit means, advantageously between the pipe 28 and the valve 30.

The slip connection 32, best seen in FIGURES 2–5, comprises an outer tubular member 34, threaded at 36 for attachment to the housing of valve 30 and an inner tubular member 38 telescoped into the outer member 34 and socketed at 40 to facilitate its attachment to the pipe 28, as by brazing.

The inner surface of the outer member 34 is preferably formed as a smooth bore 42. The outer surface of the inner tubular member 38 is formed with circumferential lands or ribs 44, 46 adjacent its opposite ends, separated by an elongated groove 48. The land 46 is provided with a circumferential groove 50 which receives a pair of split steel sealing rings 52 of square cross section.

The outer tubular member 34 is provided with a wrenching portion 53 of hexagonal cross section intermediate its length to facilitate its being threaded into the housing of valve 30 by means of a standard wrench while still minimizing the overall weight of the connection.

As indicated above, the inner tubular member 38 is preferably attached to the pipe 28. Usually after the two tubular members are attached to the valve and pipe they are then telescoped to the nominal position illustrated in FIGURE 2. A retaining ring 54 is then assembled to limit the extent of relative axial movement between the two members and particularly to prevent their coming apart in the event of extreme differential expansion (of the anti-icing conduit) or excessive pressures in the anti-icing conduit. The ring 54 is formed by threading a wire through a hole 56 angled through the wrenching portion 53 tangentially of a groove 58 (FIGURES 2 and 5) formed on the inner bore of the member 34. The split ring thus formed rides freely in the groove 48 and is engageable with the lands 44, 46 to limit relative axial movement of the two tubular members.

The flat outer peripheries of the rings 52 effectively seal against the bore 42 regardless of the extent of permitted relative movement between thte two members 34 and 38. In this connection it will be noted (FIGURE 3) that the split portions of the two rings 52 are angularly offset, preferably by 180°, so that there is no leakage path between their ends.

Another factor to be considered in providing the present slip connection is that oftentimes there will be angular misalignment between the pipe 28 and the threaded hole in the housing of valve 30 which receives the outer tubular member 34 or the inner member 38 will otherwise be misaligned therewith.

The lands 44, 46 further serve to limit possible misalignment so that an effective sealing action will be maintained by the sealing rings 52. This is of particular importance inasmuch as the pressure of the anti-icing air may be as high as 300 p.s.i. or even higher. It will be noted that the outer end of the land 46 is tapered at 60 and the land 44 is spherical or relieved so that in the event the two members are cocked to the limit permitted by these lands, there will be no sharp edge tending to "dig into" the bore 42 and prevent or seriously limit relative axial movement thereof and further the flat outer peripheries of the rings 52 will at all times be maintained in effective sealing engagement with the bore 42.

Various modifications of the described embodiment will occur to those skilled in the art within the spirit and scope of the invention which are therefore to be derived solely from the following claims.

Having thus described the invention, what is claimed as novel and desired to be secured by Letters Patent of the United States is:

1. In an axial flow compressor incorporated in a gas turbine engine for the propulsion of aircraft,
said compressor comprising hollow elements at the intake end thereof which are subject to icing, and
conduit means conducting pressurized, heated anti-icing air to said hollow elements from an after portion of the compressor,
a slip connection interposed in said conduit means,
said connection comprising a pair of tubular members respectively connectable at opposite ends to said conduit means and telescope together,
the outer tubular member having a smooth bore therethrough,
the inner tubular member having a pair of spaced circumferential ribs defining at their inner ends a retainer groove,
the inwardmost telescoped rib having a circumferential groove,
a pair of split sealing rings disposed in said groove and sealingly engaging the bore of the outer tubular member, the split ends of said rings being angularly offset to prevent leakage therepast,
said outer tubular member having an enlarged wrenching portion intermediate its length to facilitate its attachment to the conduit means, and
a retainer member insertable through said wrenching portion into said retainer groove to limit relative axial movement of the two tubular members.

2. In an axial flow compressor incorporated in a gas turbine engine for the propusion of aircraft,
said compressor comprising hollow elements at the intake end thereof which are subject to icing, and
conduit means conducting pressurized, heated anti-icing air to said hollow elements from an after portion of the compressor,
a slip connection interposed in said conduit means,
said connection comprising a pair of tubular members which are telescoped together,
the outer of said members being threaded for connection with said conduit means and the inner of said members being socketed for connection with said conduit means,
the outer tubular member having a smooth bore therethrough,
the inner tubular member having a pair of spaced circumferential ribs defining at their inner ends a retainer groove,
the innermost telescoped rib having a circumferential groove,
a pair of split sealing rings of rectangular cross section disposed in said groove and sealingly engaging the bore of the outer tubular member, the split ends of said rings being angularly offset to prevent leakage therepast,
the outer ends of said ribs being relieved whereby as they function to limit relative angular misalignment between the two tubular members, there will be no undue stress concentrations on the bore of the outer member which would prevent relative axial movement between the two members,
said outer tubular member having an enlarged wrenching portion, intermediate its length, to facilitate attachment of the threaded portion thereof to the conduit means,
said outer tubular member having a circumferential semicircular groove aligned with said wrenching portion and a hole through said wrenching portion tangentially aligned with said groove, and
a retainer ring in the form of a wire threaded through said hole and following said groove with a portion thereof extending into said retainer groove to limit the extent of relative axial movement between the two tubular members.

3. A slip connection for joining conduit means and comprising
a pair of tubular members respectively connectable at their opposite ends to said conduit means and telescoped together,
one of said tubular members having a smooth sealing surface and the other member having sealing ring means captured thereon and sealingly engaging said sealing surface,
said members having radial clearance between their telescoped portions thereby permitting angular misalignment therebetween, and engageable means adjacent opposite ends of said members for limiting angular misalignment thereof as they telescoped and maintaining the sealing ring means in effective sealing engagement with said sealing surface, said engageable means being relieved to permit free relative axial movement between said members even when at their limit of angular misalignment.

References Cited

UNITED STATES PATENTS

| | | | |
|---|---|---|---|
| 618,194 | 1/1899 | Thomson | 285—302 |
| 2,521,127 | 9/1950 | Price | 285—302 |
| 2,672,924 | 3/1954 | Anthes | 285—305 |
| 3,123,283 | 3/1964 | Leis | 230—132 |
| 3,268,260 | 8/1966 | Snipe | 285—305 |

FOREIGN PATENTS 540,490  10/1941  Great Britain.

DONLEY J. STOCKING, *Primary Examiner.*

HENRY F. RADUAZO, *Examiner.*